US007082208B2

(12) United States Patent
Tsumori et al.

(10) Patent No.: US 7,082,208 B2
(45) Date of Patent: Jul. 25, 2006

(54) SPEAKER ASSEMBLY HAVING PLURAL DRIVERS

(75) Inventors: Katsuhiko Tsumori, Kobe (JP); Akira Nishikawa, Kobe (JP); Hiroshi Kowaki, Kobe (JP); Hiroyuki Yoshii, Ikoma (JP)

(73) Assignees: Fujitsu Ten Limited, Hyogo (JP); Timedomain Corporation, Nara (JP)

( * ) Notice: Subject to any disclaimer, the term of this patent is extended or adjusted under 35 U.S.C. 154(b) by 56 days.

(21) Appl. No.: 10/790,071

(22) Filed: Mar. 2, 2004

(65) Prior Publication Data

US 2004/0165738 A1 Aug. 26, 2004

Related U.S. Application Data

(62) Division of application No. 09/986,668, filed on Nov. 9, 2001, now Pat. No. 6,724,909.

(30) Foreign Application Priority Data

Nov. 10, 2000 (JP) .......................... P2000-344214

(51) Int. Cl.
*H04R 25/00* (2006.01)

(52) U.S. Cl. ....................... 381/412; 381/182; 381/413

(58) Field of Classification Search ........ 381/161–162, 381/182, 386, 387–390, 395, 397, 353–354, 381/412–413; 181/175, 179, 199, 208–209
See application file for complete search history.

(56) References Cited

U.S. PATENT DOCUMENTS 977,616 A 12/1910 Gottschalk
3,393,764 A * 7/1968 Schafer ...................... 381/182
4,176,249 A * 11/1979 Inanaga et al. ............. 381/182
4,230,907 A 10/1980 Hasselbach et al.
4,720,868 A * 1/1988 Hirano ....................... 381/182
4,837,839 A * 6/1989 Andrews .................... 381/182
5,339,286 A * 8/1994 Esposto ...................... 381/182
6,373,956 B1 * 4/2002 Varla et al. ................. 381/353
6,628,792 B1 * 9/2003 Paddock ..................... 381/182
6,724,909 B1 * 4/2004 Tsumori et al. ............. 381/397

FOREIGN PATENT DOCUMENTS

| | | |
|---|---|---|
| EP | 0 917 396 | 5/1999 |
| JP | 61-267500 | 11/1986 |
| JP | 63-212000 | 9/1988 |
| JP | 5-153680 | 6/1993 |
| JP | 11-41685 | 2/1999 |
| JP | 11-146471 | 5/1999 |
| JP | 11-341586 | 12/1999 |
| JP | 2000-59879 | 2/2000 |

* cited by examiner

*Primary Examiner*—Suhan Ni
(74) *Attorney, Agent, or Firm*—Wenderoth, Lind & Ponack, L.L.P.

(57) ABSTRACT

A weight is attached to the rear side of a magnetic circuit of a speaker unit. The tip of a boss that projects to the front side from the weight is joined to the rear side of a center pole of the magnetic circuit with a bolt. Even if reactive force that is generated when an electrical signal is converted into mechanical vibration by the magnetic circuit and a voice coil and sound waves are emitted from a vibration plate is transmitted to the magnetic circuit, the vibration of the magnetic circuit is suppressed by the weight. In this manner, sound quality with a good transient characteristic can be obtained.

1 Claim, 6 Drawing Sheets

SPEAKER ASSEMBLY HAVING PLURAL DRIVERS

This is a Divisional Application of U.S. patent application Ser. No. 09/986,668, filed Nov. 9, 2001, now U.S. Pat. No. 6,724,909.

BACKGROUND OF THE INVENTION

1. Field of the Invention

The present invention relates to a speaker apparatus for converting an electrical signal into an acoustic signal, and more specifically, to a structure for improving the sound quality.

2. Description of the Related Art

Conventionally, acoustic reproduction is performed by a speaker system 1 having a basic structure as shown in FIG. 7. In the speaker system 1, one or a plurality of speaker units 2 are accommodated in an enclosure 3. The speaker unit 2, which in many cases assumes a generally conical cross-section, has a vibration plate 4 called "cone." The speaker unit 2 is also equipped with a magnetic circuit 5, which has a main magnet 6, a center pole 7, and a plate 8. In a magnetic gap between the center pole 7 and the plate 8 is concentrated magnetic flux generated by the main magnet 6 in high density. A voice coil 9 whose tip is joined to the base portion of the vibration plate 4 is suspended in the magnetic gap.

When the voice coil 9 is energized, driving force acts on the voice coil 9 in the magnetic gap and the vibration plate 4 is thereby displaced, whereby sound waves are emitted from the vibration plate 4 to the neighboring air. Each speaker unit 2 is accommodated in the enclosure 3 to prevent back-side sound waves (opposite in phase to front-side sound waves) from going around the speaker unit 2 to the front side. Each speaker unit 2 has a frame 10 for use in fixing of the magnetic circuit 5 and for vibratably supporting the vibration plate 4. The frame 10 is fixed to the enclosure 3.

Having a structure called "external magnet type," the magnetic circuit 5 is suitable for a case where a ferrite magnet is used as the main magnet 6. However, the external magnet type magnetic circuit 5 leaks a large amount of flux to the outside. Where the speaker system 1 is used together with a cathode-ray tune (CRT) for acoustic reproduction as part of an audio-visual apparatus such as a TV receiver or a video player or acoustic reproduction for a personal computer or a game machine, there is fear that a color purity error or a distortion may occur and lower the image quality. Countermeasures for decreasing the leakage magnetic flux include attaching a cancellation magnet 11 to the rear side of the magnetic circuit 5 and, in addition, covering the magnetic circuit 5 with a shield cover 12.

The electromagnetic driving force acting on the voice coil 9 is transmitted to the neighboring air from the vibration plate 4. The vibration force 4 applies pressure to the neighboring air and receives reactive force therefrom. The reactive force that the vibration plate 4 receives is transmitted to the magnetic circuit 5 through electromagnetic interaction between the voice coil 9 and the magnetic circuit 5 and then transmitted from the magnetic circuit 5 to the enclosure 3 via the frame 10. Therefore, in the speaker system 1, when sound is outputted from the vibration plate 4 by driving each speaker unit 2 electrically, the speaker unit 2 itself vibrates and this vibration is transmitted to the enclosure 3. Sound is also emitted from the surfaces of the enclosure 3. Being opposite in phase to the sound emitted from the vibration plate 4, this sound interferes with the sound emitted from the vibration plate 4. As such, this sound is a factor of deteriorating the quality of sound emitted from the speaker system 1 as a whole. Further, because of reaction to the movement of the vibration plate 4 for emitting sound, the center pole 7 side of the magnetic circuit 4 tends to vibrate. Therefore, the efficiency of energy transmission from the vibration plate 4 to the air is low, which influences the transient characteristic of sound and, in terms of the sound quality, lowers a sense of speed to be given to a listener.

Japanese Unexamined Patent Publications JP-A 5-153680 (1993), JP-A 11-146471 (1999), etc. disclose a technique in which in the enclosure each speaker unit is not fixed to the front side of the frame of the speaker unit but to the rear side of the magnetic circuit. By fixing the magnetic circuit to a grounding surface to make vibration hard to be transmitted to the magnetic circuit and to be transmitted from the frame to the enclosure, it is expected that the degree of sound emission from the enclosure will be lowered and the deterioration of sound quality will be decreased.

To strongly support the magnetic circuit portion while accommodating each speaker unit in the enclosure as in the above prior art technique, it is necessary to, for example, make the enclosure of a dividable type and assemble the enclosure after completion of support of each speaker unit. This results in problems that the number of assembling steps of the speaker apparatus increases and the structure of the enclosure becomes complex. There may be cases where the enclosure cannot be divided as exemplified by a speaker that is attached to a vehicle door as the enclosure.

SUMMARY OF THE INVENTION

An object of the invention is to provide a speaker apparatus in which a speaker unit itself can suppress vibration that is caused by reaction to the movement of a vibration plate and which can provide sound quality with a good transient characteristic even in a state that the speaker apparatus is attached to an enclosure.

A first aspect of the invention provides a speaker apparatus comprising a speaker unit including a converter, having a magnetic circuit, for converting an electrical signal into mechanical vibration along an axial line direction of a voice coil, a vibration plate for emitting sound waves to a front side of the converter, and a frame fixed to the converter, for vibratably supporting the vibration plate from its rear side; and a weight heavier than the speaker unit, having a boss formed so as to project to a front side from a central portion of the weight along the axial line of the voice coil, a cross section of the boss taken perpendicularly to the axial line being smaller than that of the magnetic circuit, and a tip of the boss being fixed to a rear side of the magnetic circuit.

This speaker apparatus that converts an electrical signal into an acoustic signal and emits the latter to the front side has the speaker unit and the weight. The speaker unit has the converter for converting an electrical signal into mechanical vibration, the vibration plate provided on the front side of the converter, for emitting sound waves, and the frame that is fixed to the converter and vibratably supports the vibration plate from the rear side. Mechanical vibration that is produced from an electrical signal is emitted, as sound waves, from the vibration plate to the neighboring air. Reactive force that acts on the vibration plate from the air is returned to the converter and vibrates the converter. However, the weight that is heavier than the speaker unit and is fixed to the rear side of the converter serves as a virtual ground and hence suppresses the vibration of the converter. Since the vibration of the converter is suppressed, even if the front portion of the frame is fixed to an enclosure, vibration that is transmitted to the enclosure via the frame can be decreased and the emission of undesired sound from the enclosure can be suppressed, whereby sound quality with a good transient characteristic can be obtained.

In this speaker apparatus, mechanical vibration produced from an electrical signal by the converter is emitted, as sound waves, from the vibration plate to the neighboring air. Reactive force that acts on the vibration plate from the air is returned to the converter and vibrates the converter. However, the weight that is heavier than the speaker unit and is fixed to the rear side of the converter serves as a virtual ground and hence suppresses the vibration of the converter. Since the vibration of the converter is suppressed, even if the front portion of the frame is fixed to an enclosure, vibration that is transmitted to the enclosure via the frame can be decreased and the emission of undesired sound from the enclosure can be suppressed, whereby sound quality with a good transient characteristic can be obtained.

Since the tip of the boss projecting from the weight is attached to the rear side of the external magnet type magnetic circuit in such a manner that the boss extends along the axial line of the voice coil, the area of junction between the magnetic circuit and the weight can be made small. As the junction area becomes larger, it becomes more difficult to join the weight to the rear side of the magnetic circuit uniformly over the entire junction surface and hence abnormal sound becomes more prone to occur due to vibration-induced closing and opening of a slight gap. However, in this speaker apparatus, since only the tip of the boss projecting from the weight is joined to the rear side of the magnetic circuit, sufficient junction uniformity can easily be secured. Where the weight is made of a ferromagnetic material such as iron, there is fear that magnetic flux may escape from the magnetic gap. However, in this speaker apparatus, since the weight is joined to the magnetic circuit only in the neighborhood of the axial line, even if the weight is made of a ferromagnetic material, its influence on the magnetic flux generated by the magnetic circuit can be minimized.

Since the tip of the boss projecting from the weight is attached to the rear side of the external magnet type magnetic circuit in such a manner that the boss extends along the axial line of the voice coil, the area of junction between the magnetic circuit and the weight can be made small. Since only the tip of the boss projecting from the weight is joined to the rear side of the magnetic circuit, sufficient junction uniformity can easily be secured. Further, since the weight is joined to the magnetic circuit only in the neighborhood of the axial line, even if the weight is made of a ferromagnetic material, its influence on the magnetic flux generated by the magnetic circuit can be minimized, whereby the electroacoustic conversion efficiency of the speaker apparatus can be prevented from being reduced.

The magnetic circuit may be of an external magnet type and have an annular cancellation permanent magnet for decreasing leakage magnetic flux on the rear side of an annular main permanent magnet for generating magnetic flux for driving the voice coil. The boss of the weight may penetrate through a hollow portion of the cancellation permanent magnet and be fixed to the rear side of a center pole of the magnetic circuit.

With this configuration, although the cancellation permanent magnet for decreasing leakage magnetic flux is provided on the rear side of the magnetic circuit, since the boss of the weight can be joined to the magnetic circuit at a position close to the rear side of the main permanent magnet while penetrating through the hollow portion of the annular cancellation permanent magnet, vibration of the magnetic circuit can be suppressed by directly adding a weight to the magnetic circuit that receives reactive force from the voice coil.

Although the cancellation permanent magnet for decreasing leakage magnetic flux is provided on the rear side of the magnetic circuit, this configuration makes it possible to suppress vibration of the magnetic circuit by directly adding a weight to the magnetic circuit that receives reactive force from the voice coil.

A second aspect of the invention provides a speaker apparatus comprising a speaker unit including a main converter for converting an electrical signal into mechanical vibration, a vibration plate for emitting sound waves to the front side of the main converter, and a frame fixed to the converter, for vibratably supporting the vibration plate from a rear side thereof; a compensation converter for converting an electrical signal to mechanical vibration, the compensation converter being fixed to a rear side of the main converter and smaller and lighter than the main converter; and a compensation mass body lighter than the vibration plate, for serving as a load of mechanical vibration of the compensation converter.

With this configuration, the compensation converter that is smaller and lighter than the converter of the speaker unit is fixed to the rear side of the speaker unit, and the compensation mass body that is lighter than the vibration system of the speaker unit serves as a load of mechanical vibration of the compensation converter. The compensation converter is electrically driven so that the compensation mass body is given approximately the same momentum as the vibration system of the speaker unit is given when the converter of the speaker unit is driven, whereby the reactive force received by the converter of the speaker unit is made opposite in direction to that received by the compensation converter and the two reactive forces cancel out each other, as a result of which vibration can be suppressed. Since the vibration of the converters is suppressed, even if the front side of the frame is fixed to an enclosure, vibration that is transmitted to the enclosure via the frame can be made small. Therefore, the emission of undesired sound from the enclosure can be suppressed, whereby sound quality with a good transient characteristic can be obtained.

With this configuration, the compensation converter that is smaller and lighter than the converter of the speaker unit is fixed to the rear side of the speaker unit, and the compensation mass body that is lighter than the vibration system of the speaker unit serves as a load of mechanical vibration of the compensation converter. However, since the compensation converter is electrically driven so that the compensation mass body is given approximately the same momentum as the vibration system of the speaker unit is given when the converter of the speaker unit is driven, the reactive force received by the converter of the speaker unit is made opposite in direction to that received by the compensation converter and the two reactive forces cancel out each other, as a result of which vibration can be suppressed. Since the vibration of the converters is suppressed, even if the front side of the frame is fixed to an enclosure, vibration that is transmitted to the enclosure via the frame can be made small. Therefore, the emission of undesired sound from the enclosure can be suppressed, whereby sound quality with a good transient characteristic can be obtained. Since the compensation converter and the compensation mass body are made smaller and lighter, the weight of the speaker apparatus is not much increased.

A third aspect of the invention provides an acoustic signal output apparatus comprising a speaker unit including a main converter for converting an electrical signal into mechanical vibration, the main converter having a first movable portion capable of moving along a predetermined axial line, a vibration plate attached to the first movable portion, for emitting sound waves to a front side of the main converter, and a frame fixed to the main converter, for vibratably supporting the vibration plate from the rear side thereof; a compensation converter for converting an electrical signal to mechanical vibration, the compensation converter being fixed to a rear side of the main converter and having a second movable portion capable of moving along the predetermined axial line; a compensation mass body attached to the second movable portion, for serving as a load of mechanical vibration of the compensation converter; a signal source for generating an electrical signal corresponding to an acoustic signal to be outputted; and a signal processing circuit for receiving an output of the signal source, amplifying or attenuating the output, and supplying the main converter and the compensation converter with respective electrical signals having such phases that the first movable portion and the second movable portion move in opposite directions.

With this configuration, an electrical signal that is outputted from the signal source is supplied to the main converter and the compensation converter via the signal processing circuit, whereby the vibration plate of the speaker unit is driven and an acoustic signal is outputted. The main converter and the compensation converter are supplied with such electrical signals that the first movable portion and the second movable portion move in opposite directions. Therefore, reactive force received by the main converter and that received by the compensation converter have the same phase and act in opposite directions and hence cancel out each other, whereby vibration can be suppressed. This prevents adverse effects on an output acoustic signal and hence prevents deterioration in sound quality.

The signal processing circuit may comprise a first amplification circuit for amplifying a signal to be supplied to the main converter and a second amplification circuit for amplifying a signal to be supplied to the compensation converter, amplification factors of the first and second amplification circuits being determined in accordance with loads of mechanical vibration of the main converter and the compensation converter, respectively.

With this configuration, an electrical signal that is outputted from the signal source is amplified by the first amplification circuit and then supplied to the main converter, and is also amplified by the second amplification circuit and then supplied to the compensation converter. The amplification factors of the first and second amplification circuits are determined in accordance with the loads of mechanical vibration of the main converter and the compensation converter, respectively. For example, if the loads are the same, the amplification factors are set at the same value. If the loads are different from each other, the amplification factor of one amplification circuit corresponding to a converter having a smaller load is set larger than that of the other amplification circuit. With this configuration, even if the loads of the main converter and the compensation converter are different from each other, the two converters amplification factors of the drive currents, that is, electrical signals applied to the two converters, can be set correctly in accordance with, for example, a similarity ratio between the two converters.

The signal processing circuit may comprise an amplification circuit for amplifying a signal to be supplied to the main converter and the compensation circuit and an attenuation circuit for attenuating an output of the amplification circuit and supplying an attenuated signal to the main converter, an attenuation factor of the attenuation circuit being determined in accordance with loads of mechanical vibration of the main converter and the compensation converter.

With this configuration, an electrical signal that is outputted from the signal source is amplified by the amplification circuit. An output of the amplification circuit is on one hand supplied to the compensation converter as it is, and on the other hand attenuated by the attenuation circuit and then supplied to the main converter. The attenuation factor of the attenuation circuit is determined in accordance with the loads of mechanical vibration of the main converter and the compensation converter. With this configuration, the two converters amplification factors of the drive currents, that is, electrical signals applied to the two converters, can be set correctly in accordance with, for example, a similarity ratio between the two converters.

The invention further provides a speaker apparatus which converts an electrical signal into an acoustic signal and emits the acoustic signal to the front side, comprising a speaker unit including a converter for converting an electrical signal into mechanical vibration, a vibration plate provided on the front side of the converter, for emitting sound waves, and a frame fixed to the converter, for vibratably supporting the vibration plate from the rear side; a compensation converter fixed to a rear side of the converter of the speaker unit, for converting an electrical signal to mechanical vibration in the same manner as the converter of the speaker unit does; and a compensation vibrator for serving as a load of mechanical vibration of the compensation converter, the compensation vibrator being approximately as heavy as a vibration system of the speaker unit.

With this configuration, the compensation converter that is equivalent to the converter of the speaker unit is fixed to the rear side of the speaker unit, and the compensation vibrator approximately as heavy as the vibration system of the speaker unit serves as a load of mechanical vibration of the compensation converter. An electrical signal equivalent to an electrical signal for driving the converter of the speaker unit is applied to the compensation converter so that reactive force received by the converter of the speaker unit is opposite in direction to that received by the compensation converter, whereby the two reactive forces cancel out each other and vibration can be suppressed. Since the vibration of the converters is suppressed, even if the front side of the frame is fixed to an enclosure, vibration that is transmitted to the enclosure via the frame can be made small. Therefore, the emission of undesired sound from the enclosure can be suppressed, whereby sound quality with a good transient characteristic can be obtained.

This configuration makes it possible to suppress vibration of the converters by generating, on the rear side of converter of the speaker unit, vibration that is equivalent to vibration occurring in the converter of the speaker unit and causing the two kinds of vibration to cancel out each other. Since the vibration of the converters is suppressed, even if the front side of the frame is fixed to an enclosure, vibration that is transmitted to the enclosure via the frame can be made small. Therefore, the emission of undesired sound from the enclosure can be suppressed, whereby sound quality with a good transient characteristic can be obtained.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
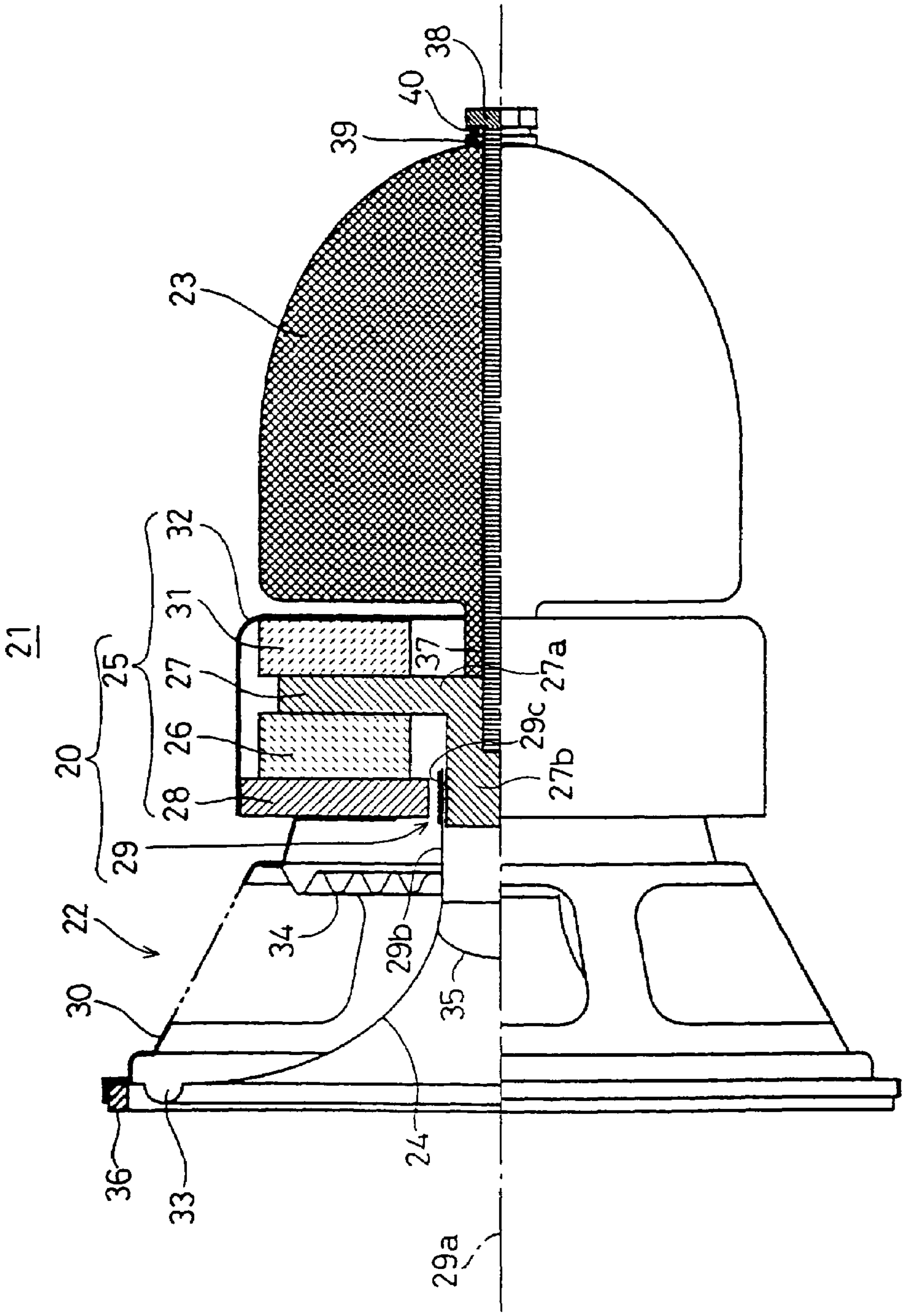
FIG. 1 is a partially sectional side view shows a schematic configuration of a speaker apparatus according to an embodiment of the invention.

Now referring to the drawings, preferred embodiments of the invention are described below.

Figure 7:
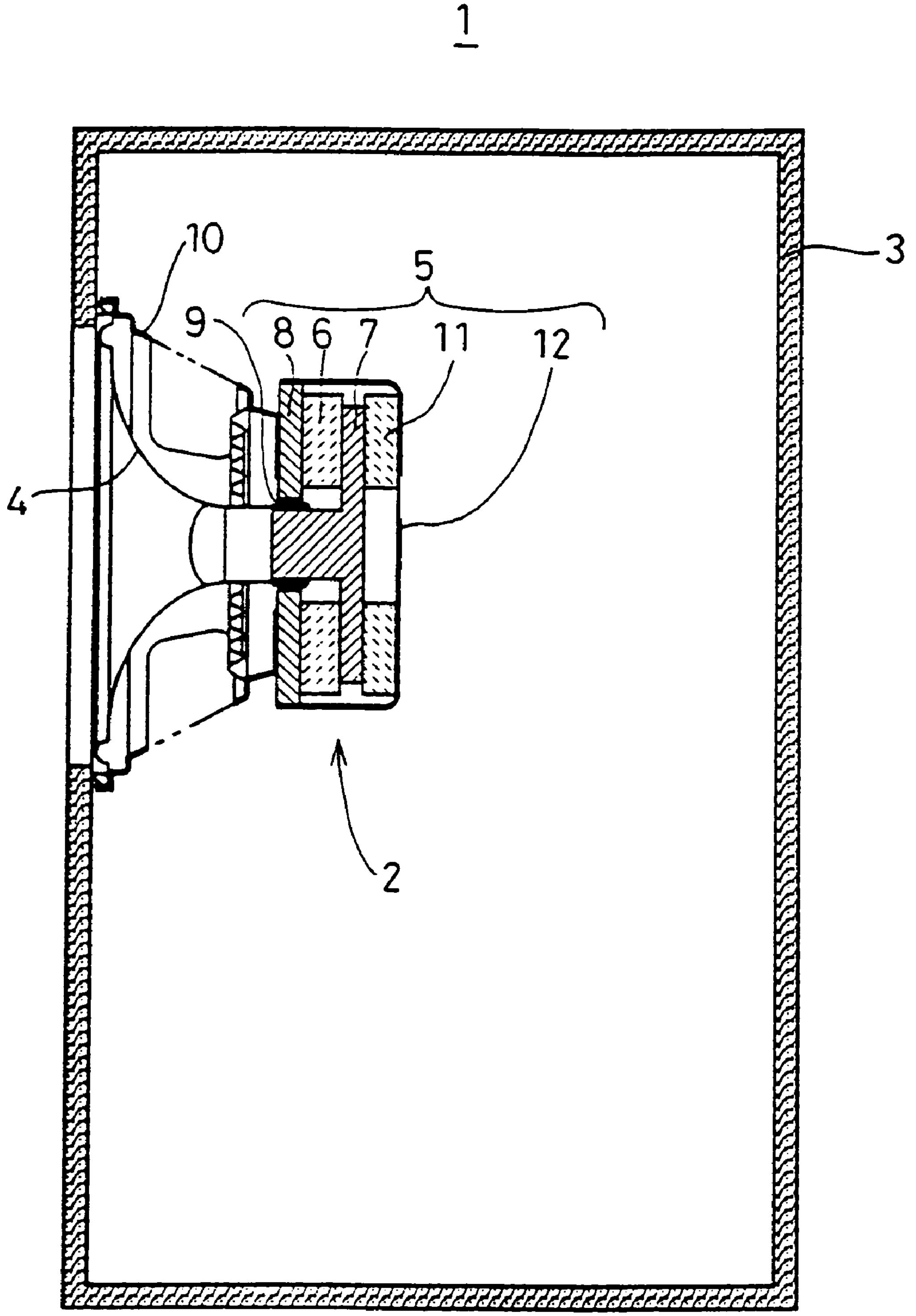
FIG. 7 PRIOR ART
FIG. 7 is a side sectional view of a conventional speaker system.

FIG. 1 shows a schematic configuration of a speaker apparatus 21 according to an embodiment of the invention. The upper half of FIG. 1 is a side sectional view and its lower half is a sectional view. That is, the speaker apparatus 21 is a rotary body formed by rotating the upper half section of FIG. 1 about an axial line 29*a*. The speaker apparatus 21 has a speaker unit 22 and a weight 23. The speaker unit 22, which is basically the same as the conventional speaker unit 2 as shown in FIG. 7, emits sound through vibration of a vibration plate 24. The vibration plate 24 is driven by utilizing a magnetic field that is generated by a magnetic circuit 25. Being of an external magnet type, the magnetic circuit 25 generates a magnetic field by means of an annular main magnet 26, a center pole 27, and a plate 28. The center pole 27 is composed of a disk 27*a* and a projection 27*b* protruding from the central portion thereof in the form of a right circular cylinder. Strong magnetic field is generated in a magnetic gap between the outer peripheral surface of the top portion of the projection 27*b* of the center pole 27 and the inner peripheral surface of the plate 28 and a voice coil 29 is suspended in the magnetic gap. The voice coil 29 includes a cylindrical bobbin 29*b* and a wire 29*c* wound on the base portion of the bobbin 29*b*. When an electrical signal is applied to the voice coil 29, electromagnetically generated force acts on the voice coil 29 along an axial line 29*a* of the voice coil 29 and drives the vibration plate 24 in the axial direction 29*a*. The vibration plate 24 is supported by a frame 30 so as to be vibratable along the axial line 29*a*.

To suppress leakage of magnetic flux to the outside, the magnetic circuit 25 of the speaker unit 22 according to this embodiment has a cancellation magnet 31 and a shield cover 32. The cancellation magnet 31 is magnetized in the opposite direction to the magnetization direction of the main magnet 26. For example, if the main magnet 26 is magnetized in such a manner that the N pole and the S pole are located on the front side (i.e. the left-hand side of FIG. 1) and the rear side (i.e. the right-hand side of FIG. 1), respectively, in a state that the main magnet 26 is set in the speaker unit 22, the cancellation magnet 31 is magnetized in such a manner that the N pole and the S pole are located on the rear side and the front side, respectively. Each of the main magnet 26 and the cancellation magnet 31 is a ferrite-type permanent magnet. The center pole 27, the plate 28, and the shield cover 32 are made of a ferromagnetic material such as iron. In the magnetic circuit 25, the inner surface, i.e. the left-hand surface as observed in FIG. 1, of the shield cover 32, the cancellation magnet 31, the disk 27*a* of the center pole 27, the main magnet 26, and the plate 28 make intimate contact with one another along the axial direction 29*a* of the voice coil 29.

The vibration plate 24 is supported to as to be able to vibrate relative to the frame 30 along the axial line 29*a* by means of an edge 33 that is attached to the front-side outer peripheral surface of the vibration plate 24 and a damper 34 that is attached to the base portion of the vibration plate 24 and has a vibration damping function. The base portion of the vibration plate 24 is joined to the front portion of the bobbin 29*b* of the voice coil 29. A wire 29*c* is wound on the base portion of the bobbin 29*b* of the voice coil 29, whereby the voice coil 29 receives force that results from the electromagnetic interaction with a magnetic field in the magnetic gap G. The front-side opening of the voice coil 29 is closed by a dust cap 35 to prevent dust or the like from entering the magnetic gap. A gasket 36 is attached to the outer peripheral surface of the edge 33 to prevent the edge 33 from being crushed when the speaker unit 22 is attached to a cabinet.

The weight 23 is provided on the rear side of the magnetic circuit 25 of the speaker unit 22. The weight 23 is heavier than the entire speaker unit 22. For example, the weight 23 is made of iron and 1.5 times heavier than the entire speaker unit 22. The weight 23 generally assumes a cannonball-like shape having a flat end face on the front side and a streamline curved surface on the rear side. The cross section of the weight as taken perpendicularly to the axial line 29*a* is smaller than that of the magnetic circuit 25. A boss 37 projects from the center of the front end face of the weight 23. Only the tip of the boss 37 of the weight 23 is joined to the rear side of center pole 27 of the speaker unit 22. In this embodiment, the weight 23 is formed, along its center line, with a through-hole that goes from the rear end of the weight 23 to the tip of the boss 37. A bolt 38 is inserted into the through-hole from the rear side and joined to the center pole 27 in such a manner as to be engaged with threads that are formed in the center pole 27 along its center line. A flat washer 39 and a spring washer 40 are provided on the side of the head of the bolt 38 to prevent loosening of the bolt 38. Alternatively, the bolt 38 may be integrated with the weight 23 in such a manner that the weight 23 is formed with a threaded projection.

In this embodiment, in the speaker apparatus 21 for converting an electrical signal into an acoustic signal and emits the latter to the front side, the magnetic circuit 25 and the voice coil 29 form a converter 20 for converting an electrical signal into mechanical vibration. And the speaker unit 22 is provided with the vibration plate 24 for emitting sound waves to the front side of the converter 20 and the frame 30 that vibratably supports the vibration plate 24 from the rear side and that is fixed to the converter 20. The weight 23 is fixed to the rear side of the converter 20 and is heavier than the speaker unit 22.

Mechanical vibration that is produced from an electrical signal by the converter 20 is emitted, as sound waves, from the vibration plate 24 to the neighboring air. Reactive force that acts on the vibration plate 24 from the air is returned to the converter 20 and vibrates the converter 20. However, the weight 23 that is heavier than the speaker unit 22 is fixed to the rear side of the converter 20. Because of the resultant inertia, the weight 23 serves as a virtual ground, and hence the vibration of the converter 20 is suppressed.

The converter 20 of the speaker unit 22 according to this embodiment has the magnetic circuit 25 and converts an electrical signal into vibration along the axial direction 29*a* of the voice coil 29 (electromotive type). The weight 23 is provided in such a manner that its center line coincides with the axial line 29*a* of the voice coil 29. The cross section of the weight 23 taken perpendicularly to the axial line 29*a* is smaller than that of the magnetic circuit 25. The boss 37 projects from the center of the weight 23 to the front side along the axial line 29*a*, and the tip of the boss 37 is fixed to the rear side of the magnetic circuit 25 of the converter 20. Since the tip of the boss 37 projecting from the weight 23 is attached to the rear side of the external magnet type magnetic circuit 25 in such a manner that the boss 37 extends along the axial line 29*a* of the voice coil 29, the area of junction between the magnetic circuit 29 and the weight 23 can be made small. As the junction area becomes larger, it becomes more difficult to join the weight 23 to the rear side of the magnetic circuit 25 uniformly over the entire junction surface and hence abnormal sound becomes more prone to occur due to vibration-induced closing and opening of a slight gap. In the embodiment, since only the tip of the boss 37 projecting from the weight 23 is joined to the rear side of the magnetic circuit 25, sufficient junction uniformity can easily be secured. Where the weight 23 is made of a ferromagnetic material such as iron, magnetic flux escapes from the magnetic gap to weaken the magnetic field there. In the embodiment, since the weight 23 is joined to the magnetic circuit 25 only in the neighborhood of the axial line 29*a*, although the weight 23 is made of a ferromagnetic material, its influence on the magnetic flux generated by the magnetic circuit 25 can be minimized.

Being of an external magnet type, the magnetic circuit 25 is provided with the cancellation magnet 31 as the annular cancellation permanent magnet for decreasing leakage magnetic flux on the rear side of the main magnet 26 as the annular main permanent magnet for generating magnetic flux for driving the voice coil 29. The boss 37 of the weight 23 penetrates through an opening portion formed on the central portion of the shield cover 32 and the hollow portion of the cancellation magnet 31 and is fixed to the rear side of the center pole 27 of the magnetic circuit 25. Although the cancellation magnet 31 for decreasing leakage magnetic flux is provided on the rear side of the magnetic circuit 25, since the boss 37 of the weight 23 can be joined to magnetic circuit 25 at a position close to the rear side of the main magnet 26 while penetrating through the hollow portion of the annular cancellation magnet 31, vibration of the magnetic circuit 25 can be suppressed by directly adding a weight to the magnetic circuit 25 that receives reactive force from the voice coil 29.

Figure 2:
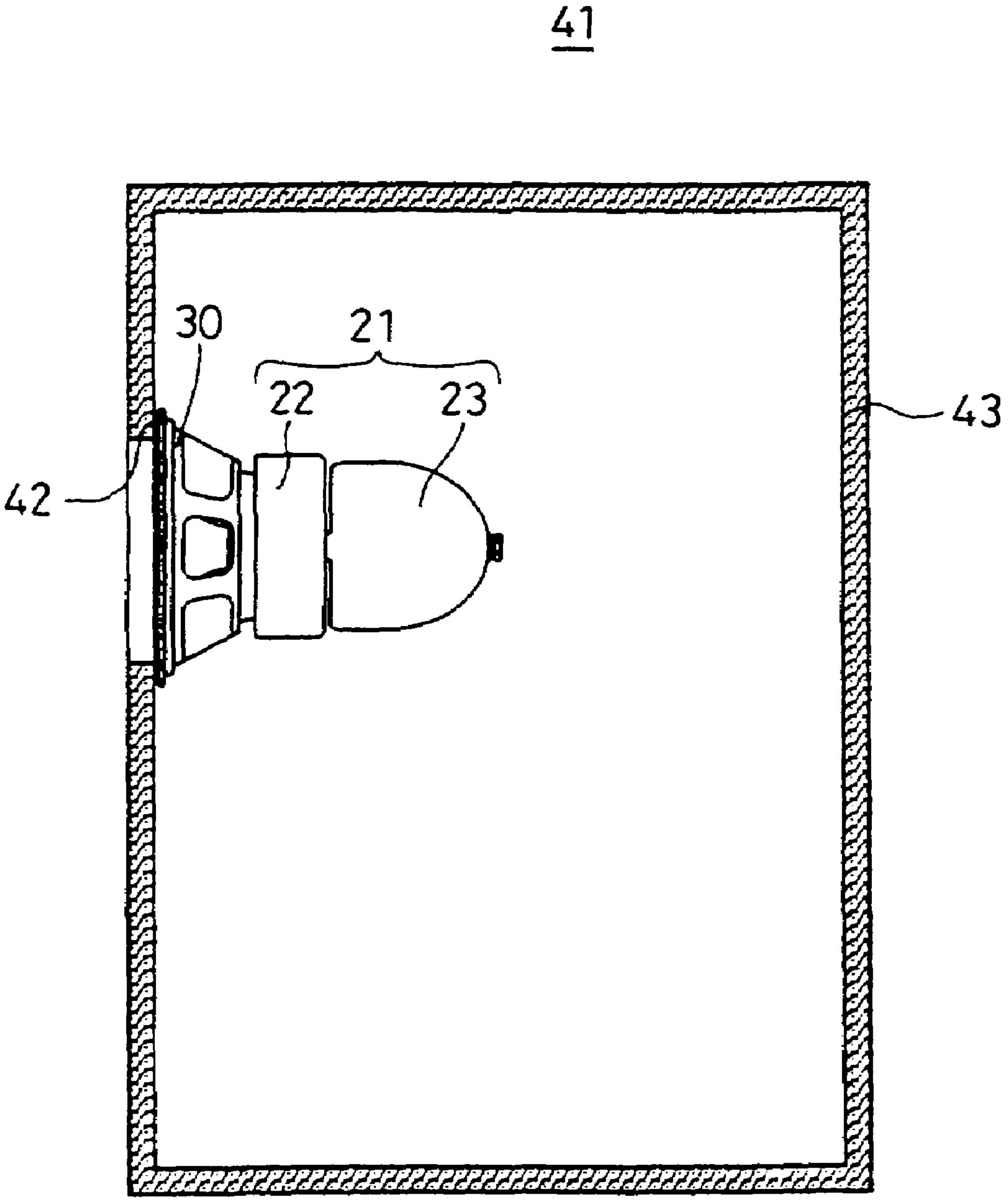
FIG. 2 is a partially sectional side view of a speaker system using the speaker apparatus of FIG. 1.

FIG. 2 shows, in a simplified manner, a speaker system 41 using the speaker apparatus 21 of FIG. 1. FIG. 2 is a side sectional view except for the speaker apparatus 21 which is shown as a side view. Like the conventional speaker unit 2 as shown in FIG. 7, the speaker unit 22 of the speaker apparatus 21, specifically, the front portion of its frame 30, is fixed to an enclosure 43 having an opening 42. Since vibration of the converter of the speaker unit 22 is suppressed by the weight 23, even if the front portion of the frame 30 is fixed to the enclosure 43, vibration that is transmitted to the enclosure 43 via the frame 30 can be made small. Therefore, the emission of undesired sound from the enclosure 43 can be suppressed, whereby sound quality with a good transient characteristic can be obtained.

Conventionally, a very large number of structures are available as the structure for attaching the speaker unit 22 to the enclosure 43 and as the structure of the enclosure 43. FIG. 2 shows a simplest combination of those structures. Where the weight 23 is heavy, it may directly be supported by a certain means in the enclosure 43. Since the vibration-suppressed portion is supported, only a small amount of vibration is transmitted from the supported portion to the enclosure 43 and hence deterioration of the sound quality can be avoided.

Figure 3:
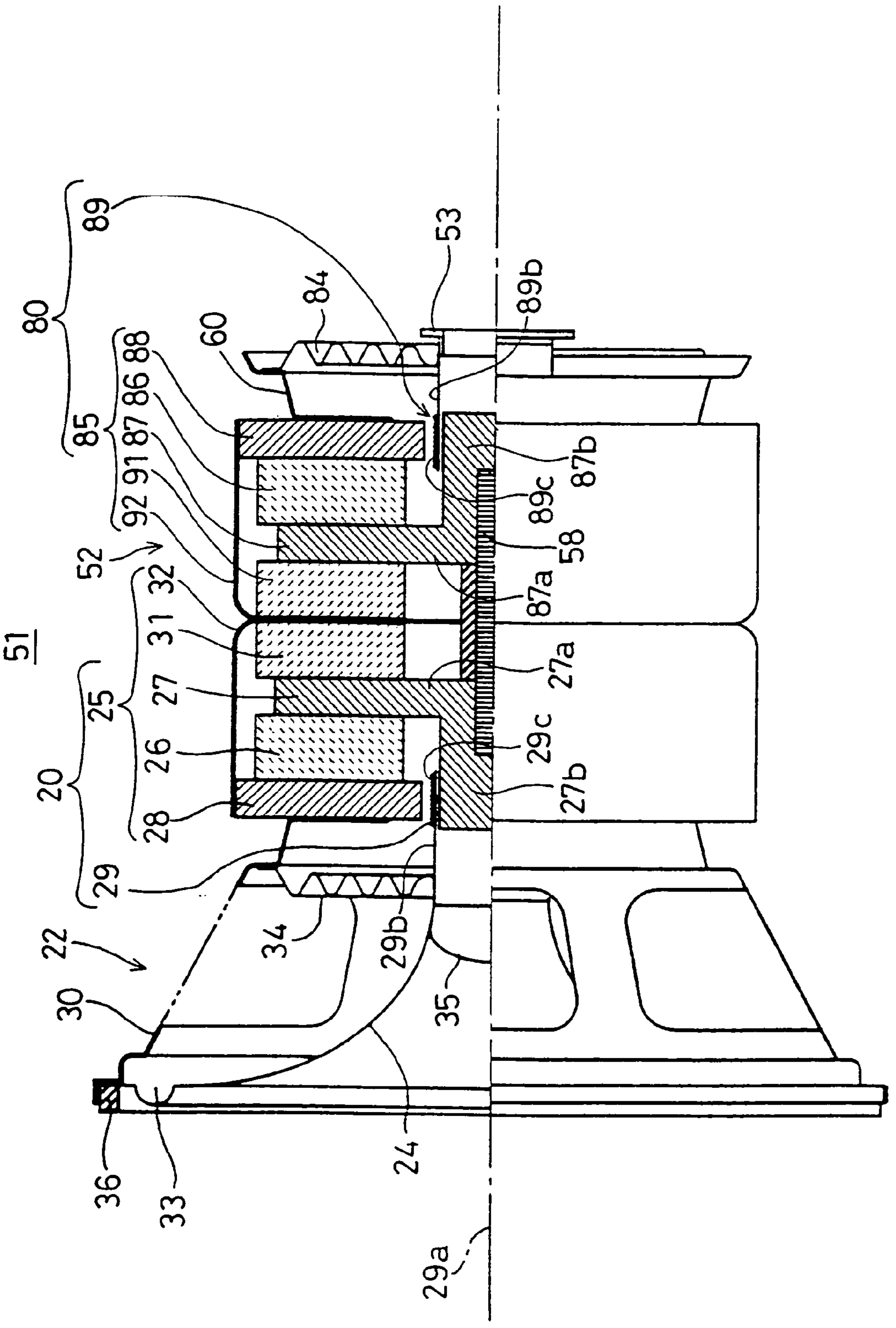
FIG. 3 is a partially sectional side view shows a schematic configuration of a speaker apparatus according to another embodiment of the invention.

FIG. 3 shows a schematic configuration of a speaker apparatus 51 according to another embodiment of the invention. Likewise as FIG. 1, the upper half of FIG. 3 is a side sectional view and its lower half is a sectional view. That is, the speaker apparatus 51 is a rotary body formed by rotating the upper half section of FIG. 3 about an axial line 29*a*. Components in FIG. 3 having the corresponding components in FIG. 1 are given the same reference numerals as the latter and redundant descriptions will be omitted. In the speaker apparatus 51 according to this embodiment, a compensation unit 52 is attached to the rear side of the speaker unit 22. The compensation unit 52 has a magnetic circuit 85 and a voice coil 89 that have basically the same structure as the magnetic circuit 25 and the voice coil 29 of the speaker unit 22, respectively. The voice coil 89 of the compensation unit 52 is supported so as to be vibratable along the axial line 29*a* by a damper 84 that has basically the same structure as the damper 34 of the speaker unit 22. However, where the compliance of the edge 33 of the speaker unit 22 is not much larger than that of the dampers 34, 84, the compliance of the edge 33 also contributes to the vibration of the vibration plate 24. Therefore, in such a case, the damper 84 of the compensation unit 52 is replaced by a damper that is smaller in compliance than the dampers 34, 84. The mass of the vibration system including the vibration plate 24 and the dust cap 35 of the speaker unit 22 and the air around the vibration plate 24 is attached to the bobbin 89*b* of the voice coil 89 of the compensation unit 52 rather than the weight 53. The magnetic circuits 25, 85 of the speaker unit 22 and the compensation unit 52 are provided back to back and joined to each other with a bolt 58. The center poles 27, 87 of each magnetic circuits 25, 85 is formed with a female screw to engage the bolt 58. The damper 84 of the compensation unit 52 is supported by a partial frame 60.

In this embodiment, the speaker apparatus 51 for converting an electrical signal into an acoustic signal and emitting the latter to the front side has the speaker unit 22 and the compensation unit 52. The speaker unit 22 is provided with the magnetic circuit 25 and the voice coil 29 that constitute the main converter 20 for converting an electrical signal into mechanical vibration, the vibration plate 24 for emitting sound waves to the front side of the main converter 20, and the frame 30 that vibratably supports the vibration plate 24 from the rear side and that is fixed to the main converter 20. The compensation unit 52 has a compensation converter 80 that is fixed to the rear side of the main converter 20 of the speaker unit 22 and converts an electrical signal into mechanical vibration like the main converter 20 of the speaker unit 22 does and a weight 53, as a compensation mass body, that is approximately as heavy as the vibration system of the speaker unit 22 and serves as a load of mechanical vibration of the compensation converter 80.

More specifically, being of an external magnet type, the magnetic circuit 85 of the compensation converter 80 generates a magnetic field by means of an annular main magnet 86, a center pole 87, and a plate 88. The center pole 87 is composed of a disk 87*a* and a projection 87*b* protruding from the central portion thereof in the form of a right circular cylinder. Strong magnetic field is generated in a magnetic gap between the outer peripheral surface of the top portion of the projection 87*b* of the center pole 87 and the inner peripheral surface of the plate 88 and a voice coil 89 is suspended in the magnetic gap. The voice coil 89 includes a cylindrical bobbin 89*b* and a wire 89*c* wound on the base portion of the bobbin 89*b*. When an electrical signal is applied to the voice coil 89, electromagnetically generated force acts on the voice coil 89 along an axial line 29*a*, whereby the voice coil 89 moves in the axial direction 29*a*.

To suppress leakage of magnetic flux to the outside, the magnetic circuit 85 of the compensation converter 80 has a cancellation magnet 91 and a shield cover 92. The cancellation magnet 91 is magnetized in the opposite direction to the magnetization direction of the main magnet 86. For example, if the main magnet 86 is magnetized in such a manner that the S pole and the N pole are located on the front side (i.e. the left-hand side of FIG. 3) and the rear side (i.e. the right-hand side of FIG. 3), respectively, the cancellation magnet 91 is magnetized in such a manner that the N pole and the S pole are located on the front side and the rear side, respectively. Each of the main magnet 86 and the cancellation magnet 91 is a ferrite-type permanent magnet. The center pole 87, the plate 88, and the shield cover 92 are made of a ferromagnetic material such as iron. In the magnetic circuit 85, the inner surface, i.e. the right-hand surface as observed in FIG. 3, of the shield cover 92, the cancellation magnet 91, the disk 87*a* of the center pole 87, the main magnet 86, and the plate 88 make intimate contact with one another along the axial direction 29*a* of the voice coil 89. The shield cover 32 of the main converter 20 of the speaker unit 22 and the shield cover 92 of the compensation converter 80 of the compensation unit 52 are tightly fixed to each other with a bolt 58.

An electrical signal equivalent to an electrical signal for driving the converter 20 of the speaker unit 22 is applied to the converter 80 of the compensation unit 52 so that reactive force received by the converter 20 of the speaker unit 22 is opposite in direction to that received by the converter 80 of the compensation unit 52, whereby the two reactive forces cancel out each other and vibration can be suppressed. Since the vibration of the converters 20, 80 is suppressed, even if the front side of the frame 30 is fixed to an enclosure, vibration that is transmitted to the enclosure via the frame 30 can be made small. Therefore, the emission of undesired sound from the enclosure can be suppressed, whereby sound quality with a good transient characteristic can be obtained.

Figure 4:
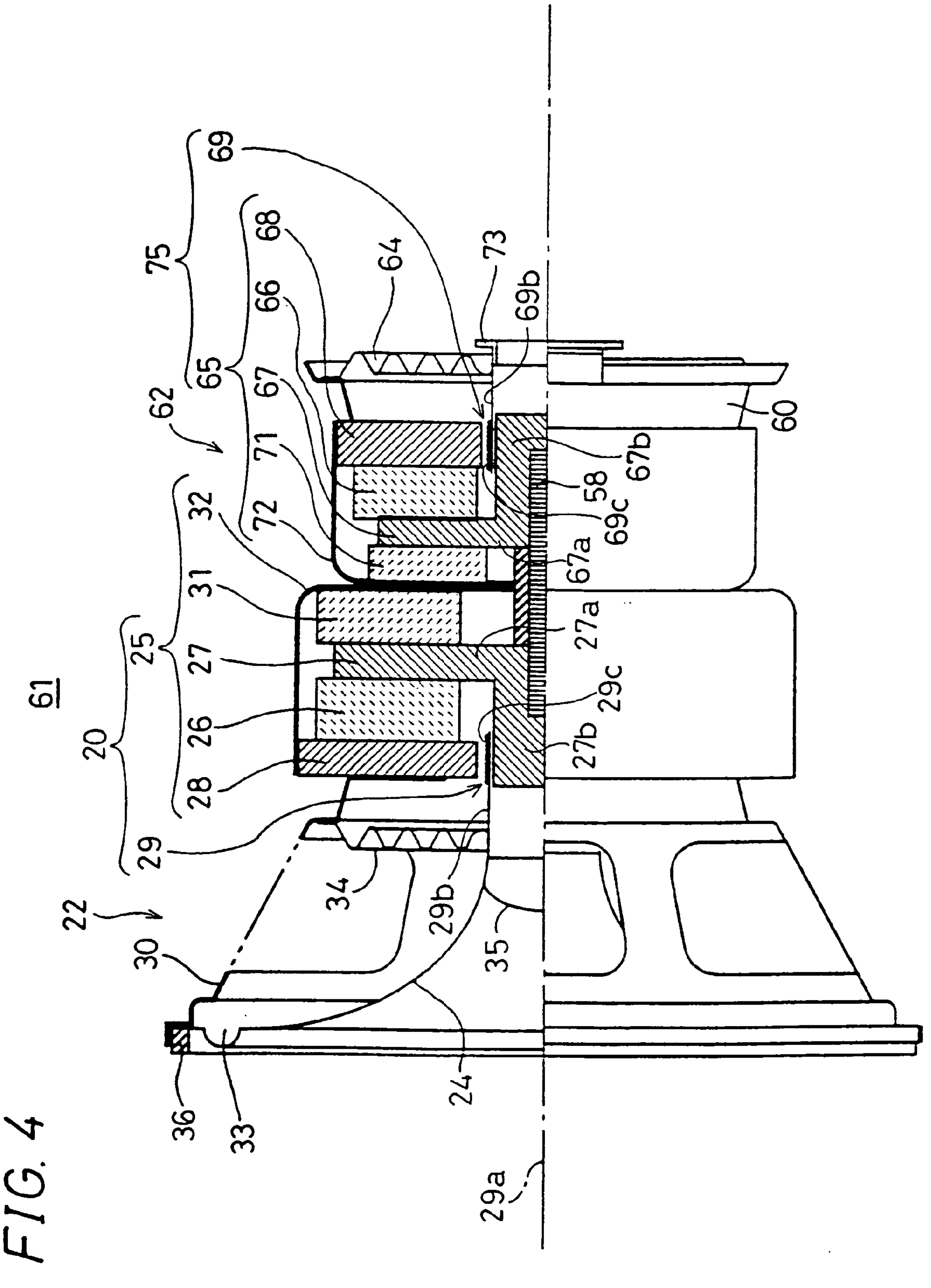
FIG. 4 is a partially sectional side view shows a schematic configuration of a speaker apparatus according to a further embodiment of the invention.

FIG. 4 shows a schematic configuration of a speaker apparatus 61 according to a further embodiment of the invention. Likewise as FIGS. 1 and 3, the upper half of FIG. 4 is a side sectional view and its lower half is a sectional view. That is, the speaker apparatus 61 is a rotary body formed by rotating the upper half section of FIG. 4 about an axial line 29*a*. Components in FIG. 4 having the corresponding components in FIG. 1 or 3 are given the same reference numerals as the latter and redundant descriptions will be omitted. In this embodiment, as in the embodiment of FIG. 3, a compensation unit 62 is attached to the rear side of the speaker unit 22. However, in the compensation unit 62 according to this embodiment, a damper 64 and a magnetic circuit 65 are different from the damper 34 and the magnetic circuit 25 of the speaker unit 22. In particular, the magnetic circuit 65 is made smaller and lighter than the magnetic circuit 25 by using a smaller main magnet 66 than the main magnet 26 of the magnetic circuit 25. In accordance with the size reduction of the main magnet 66, a center pole 67, a plate 68, a voice coil 69, a cancellation magnet 71, and a shield cover 72 are changed from the counterparts in FIG. 3. A weight 73 is also made lighter than the weight 53 in FIG. 3.

More specifically, in the speaker apparatus 61 according to this embodiment, a compensation unit 62 is attached to the rear side of the speaker unit 22. The compensation unit 62 has a magnetic circuit 65 and a voice coil 69 that have basically the same configuration as the magnetic circuit 25 and the voice coil 29 of the speaker unit 22, respectively. The voice coil 69 is supported so as to be vibratable along the axial line 29*a* by a damper 64 that has basically the same configuration as the damper 34 of the speaker unit 22. However, where the compliance of the edge 33 of the speaker unit 22 is not much larger than that of the dampers 34, 64, the compliance of the edge 33 also contributes to the vibration of the vibration plate 24. Therefore, in such a case, a damper that is smaller in compliance than the dampers 34, 64 is used. The mass of the vibration system including the vibration plate 24 and the dust cap 35 of the speaker unit 22 and the air around the vibration plate 24 is attached to the bobbin 69*b* of the voice coil 69 of the compensation unit 62 rather than the weight 73. The magnetic circuits 25, 65 of the speaker unit 22 and the compensation unit 62 are provided back to back and joined to each other with a bolt 58. The center poles 27, 67 of each magnetic circuits 25, 65 is formed with a female screw to engage the bolt 58. The damper 64 of the compensation unit 62 is supported by a partial frame 60.

In this embodiment, the speaker apparatus 61 for converting an electrical signal into an acoustic signal and emitting the latter to the front side has the speaker unit 22 and the compensation unit 62. The speaker unit 22 is provided with the magnetic circuit 25 and the voice coil 29 that constitute the main converter 20 for converting an electrical signal into mechanical vibration, the vibration plate 24 for emitting sound waves to the front side of the main converter 20, and the frame 30 that vibratably supports the vibration plate 24 from the rear side and that is fixed to the main converter 20. The compensation unit 62 has a compensation converter 75 that is fixed to the rear side of the main converter 20 of the speaker unit 22 and converts an electrical signal into mechanical vibration, the compensation converter 75 being smaller and lighter than the main converter 20 of the speaker unit 22, and a weight 73, as a compensation mass body, that is lighter than the vibration system of the speaker unit 22, for example, the vibration plate 24, and serves as a load of mechanical vibration of the compensation converter 75.

More specifically, being of an external magnet type, the magnetic circuit 65 of the compensation converter 75 generates a magnetic field by means of an annular main magnet 66, a center pole 67, and a plate 68. The center pole 67 is composed of a disk 67*a* and a projection 67*b* protruding from the central portion thereof in the form of a right circular cylinder. Strong magnetic field is generated in a magnetic gap between the outer peripheral surface of the top portion of the projection 67*b* of the center pole 67 and the inner peripheral surface of the plate 68 and a voice coil 69 is suspended in the magnetic gap. The voice coil 69 includes a cylindrical bobbin 69*b* and a wire 69*c* wound on the base portion of the bobbin 69*b*. When an electrical signal is applied to the voice coil 69, electromagnetically generated force acts on the voice coil 69 along an axial line 29*a*, whereby the voice coil 69 moves in the axial direction 29*a*.

To suppress leakage of magnetic flux to the outside, the magnetic circuit 65 of the compensation converter 75 has a cancellation magnet 71 and a shield cover 72. The cancellation magnet 71 is magnetized in the opposite direction to the magnetization direction of the main magnet 66. For example, if the main magnet 66 is magnetized in such a manner that the S pole and the N pole are located on the front side (i.e. the left-hand side of FIG. 4) and the rear side (i.e. the right-hand side of FIG. 4), respectively, the cancellation magnet 71 is magnetized in such a manner that the N pole and the S pole are located on the front side and the rear side, respectively. Each of the main magnet 66 and the cancellation magnet 71 is a ferrite-type permanent magnet. The center pole 67, the plate 68, and the shield cover 72 are made of a ferromagnetic material such as iron. In the magnetic circuit 65, the inner surface, i.e. the right-hand surface as observed in FIG. 4, of the shield cover 72, the cancellation magnet 71, the disk 67*a* of the center pole 67, the main magnet 66, and the plate 68 make intimate contact with one another along the axial direction 29*a* of the voice coil 69. The shield cover 32 of the main converter 20 of the speaker unit 22 and the shield cover 72 of the compensation converter 75 of the compensation unit 62 are tightly fixed to each other with a bolt 58.

The components 66–68, 71, and 72 of the magnetic circuit 65 of a compensation converter 75 are similar, in shape, to the respective components 26–28, 31, and 32 of the magnetic circuit 25 of the main converter 20, and the components 66–68, 71, and 72 are versions reduced at a predetermined ratio of the components 26–28, 31, and 32. The damper 64 of the compensation unit 62 is similar, in shape, to the damper 34 of the speaker unit 22, and the former is a version reduced at a predetermined ratio of the latter. In this manner, the compensation unit 62 is reduced in size and weight. A projection 27*b* of the center pole 27 of the main converter 20 may have the same size as a projection 67*b* of the center pole 67 of the compensation converter 75. The voice coil 29 of the main converter 20 may have the same size as the voice coil 69 of the compensation converter 75.

In this embodiment, the magnetic circuit 65 that is smaller and lighter than the magnetic circuit 25 of the main converter 20 of the speaker unit 22 is fixed to the rear side of the speaker unit 22. In the main converter 20 of the speaker unit 22, the mass of the magnetic circuit 25 accounts for most of the mass of the converter. The converter of the compensation unit 62 has the smaller and lighter magnetic circuit 65. Therefore, the entire converter of the compensation unit 62 is smaller and lighter than the converter of the speaker unit 22. The compensation unit 62 has a weight 73, as a compensation mass body, that is lighter than the vibration system of the speaker unit 22. The weight 73 serves as a load of mechanical vibration of the converter 75 of the compensation unit 62. The compensation unit 62 is driven in phase by a higher power so that the vibration system of the compensation unit 62 is given the same momentum as the vibration system of the speaker unit 22 is given when the converter of the speaker unit 22 is driven, whereby the reactive force received by the main converter 20 of the speaker unit 22 is made opposite in direction to that received by the compensation converter 75 of the compensation unit 62 and the two reactive forces cancel out each other, as a result of which vibration can be suppressed. Since the vibration of the converters 20 and 75 is suppressed, even if the front side of the frame 30 is fixed to an enclosure, vibration that is transmitted to the enclosure via the frame 30 can be made small. Therefore, the emission of undesired sound from the enclosure can be suppressed, whereby sound quality with a good transient characteristic can be obtained.

Figure 5:
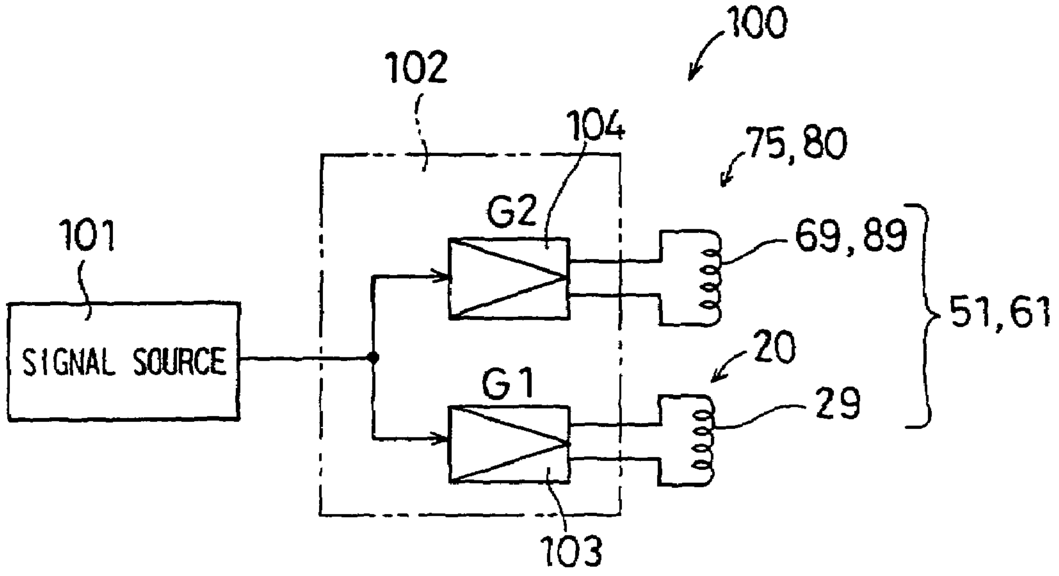
FIG. 5 is a block diagram showing, in a simplified manner, the electrical configuration of an acoustic signal output apparatus according to another embodiment of the invention.

FIG. 5 is a block diagram showing, in a simplified manner, the electrical configuration of an acoustic signal output apparatus 100 according to another embodiment of the invention. The acoustic signal output apparatus 100 has one of the speaker apparatuses 51 and 61 as shown in FIGS. 3 and 4, a signal source 101, and a signal processing circuit 102. First, a description will be made of the case where the speaker apparatus 51 of FIG. 3 is used.

As shown in FIG. 3, the speaker apparatus 51 has the speaker unit 22, the compensation converter 80, and the weight 53 as a compensation mass body. The speaker unit 22 is provided with the main converter 20 that has the voice coil 29 as a first movable portion capable of moving along the axial line 29*a* and converts an electrical signal into mechanical vibration, the vibration plate 24 that is attached to the voice coil 29 and emits sound waves to the front side of the main converter 20, and the frame 30 that is fixed to the main converter 20 and vibratably supports the vibration plate 24 from its rear side. Fixed to the rear side of the main converter 20 and having the voice coil 89 as a second movable portion capable of moving along the axial line 29*a*, the compensation converter 80 converts an electrical signal into mechanical vibration. The weight 53 is attached to the voice coil 89 and serves as a load of mechanical vibration of the compensation converter 80.

The signal source 101 generates an electrical signal corresponding to an acoustic signal to be outputted. The signal processing circuit 102 has a first amplification circuit 103 and a second amplification circuit 104 that are electrically connected to the signal source 101 in parallel. The first amplification circuit 103 amplifies a signal to be supplied to the main converter 20, and the second amplification circuit 104 amplifies a signal to be supplied to the compensation converter 80. To the first amplification circuit 103 and the second amplification circuit 104 is inputted an output of the signal source 101 in the same phase. The signal processing circuit 102 amplifies the outputs of the signal source 101, and supplies the main converter 20 and the compensation converter 80 with electrical signals having such phases that the voice coils 29 and 89 move in opposite directions.

The first amplification circuit 103 is electrically connected to the voice coil 29 of the main converter 20. The second amplification circuit 104 is electrically connected to the voice coil 89 of the compensation converter 80. The amplification factors of the first amplification circuit 103 and the second amplification circuit 104 are represented by G1 and G2, respectively.

An electrical signal from the signal source 101, corresponding to an acoustic signal to be outputted is inputted to the first amplification circuit 103 and the second amplification circuit 104 in the same phase. One of the electrical signals outputted from the signal source 101 is amplified at the amplification factor G1 by the first amplification circuit 103 and then supplied to the voice coil 29. The other electrical signal is amplified at the amplification factor G2 by the second amplification circuit 104 and then supplied to the voice coil 89. Electrical signals outputted from the first amplification circuit 103 and the second amplification circuit 104 are supplied to the respective voice coils 29 and 89 in the same phase.

The amplification factors G1 and G2 of the first amplification circuit 103 and the second amplification circuit 104 are determined in accordance with the loads of mechanical vibration of the main converter 20 and the compensation converter 80, respectively. In the speaker apparatus 51 according to an embodiment of the invention, the main converter 20 and the compensation converter 80 are identical and the weight 53 is as heavy as the vibration system of the speaker unit 22. Therefore, the amplification factors G1 and G2 are set equal to each other.

In this manner, outputs of the signal source 101 are amplified by the respective signal processing circuits 103 and 104 of the signal processing circuit 102 and the same electrical signals (having the same phase) are supplied to the respective voice coils 29 and 89. Therefore, reactive force received by the main converter 20 and that received by the compensation converter 80 have the same phase and act in opposite directions and hence cancel out each other, whereby vibration can be suppressed.

Next, a description will be made of the case where the speaker apparatus 61 as shown in FIG. 4 is used.

As shown in FIG. 4, the speaker apparatus 61 has the speaker unit 22, the compensation converter 75, and the weight 73 as a compensation mass body. The speaker unit 22 is provided with the main converter 20 that has the voice coil 29 as a first movable portion capable of moving along the axial line 29*a* and converts an electrical signal into mechanical vibration, the vibration plate 24 that is attached to the voice coil 29 and emits sound waves to the front side of the main converter 20, and the frame 30 that is fixed to the main converter 20 and vibratably supports the vibration plate 24 from its rear side. Fixed to the rear side of the main converter 20 and having the voice coil 69 as a second movable portion capable of moving along the axial line 29*a*, the compensation converter 75 converts an electrical signal into mechanical vibration. The weight 73 is attached to the voice coil 69 and serves as a load of mechanical vibration of the compensation converter 75.

The signal source 101 generates an electrical signal corresponding to an acoustic signal to be outputted. The signal processing circuit 102 has a first amplification circuit 103 and a second amplification circuit 104 that are electrically connected to the signal source 101 in parallel. The first amplification circuit 103 amplifies a signal to be supplied to the main converter 20, and the second amplification circuit 104 amplifies a signal to be supplied to the compensation converter 75. To the first amplification circuit 103 and the second amplification circuit 104 is inputted an output of the signal source 101 in the same phase. The signal processing circuit 102 amplifies the outputs of the signal source 101, and supplies the main converter 20 and the compensation converter 75 with electrical signals having such phases that the voice coils 29 and 69 move in opposite directions.

The first amplification circuit 103 is electrically connected to the voice coil 29 of the main converter 20. The second amplification circuit 104 is electrically connected to the voice coil 69 of the compensation converter 75. The amplification factors of the first amplification circuit 103 and the second amplification circuit 104 are represented by G1 and G2, respectively.

An electrical signal from the signal source, corresponding to an acoustic signal to be outputted, is inputted to the first amplification circuit 103 and the second amplification circuit 104 in the same phase. One of the electrical signals outputted from the signal source 101 is amplified at the amplification factor G1 by the first amplification circuit 103 and then supplied to the voice coil 29. The other electrical signal is amplified at the amplification factor G2 by the second amplification circuit 104 and then supplied to the voice coil 69. Electrical signals outputted from the first amplification circuit 103 and the second amplification circuit 104 are supplied to the respective voice coils 29 and 69 in the same phase.

The amplification factors G1 and G2 of the first amplification circuit 103 and the second amplification circuit 104 are determined in accordance with the loads of mechanical vibration of the main converter 20 and the compensation converter 75, respectively. In the speaker apparatus 61 according to an embodiment of the invention, the compensation converter 75 is smaller and lighter than the main converter 20 and the weight 73 is lighter than the vibration system of the speaker unit 22. Therefore, the amplification factor G2 of the second amplification circuit 104 is set larger than the amplification factor G1 of the first amplification circuit 103 so that the vibration systems of the speaker unit 22 and the compensation unit 62 are given the same momentum.

In this manner, outputs of the signal source 101 are amplified by the respective signal processing circuits 103 and 104 of the signal processing circuit 102 and electrical signals amplified at the amplification factors G1 and G2 are supplied to the respective voice coils 29 and 69 in the same phase. Therefore, reactive force received by the main converter 20 and that received by the compensation converter 75 have the same phase and act in opposite directions and hence cancel out each other, whereby vibration can be suppressed. Further, since an electrical signal to be supplied to the main converter 20 is amplified by the first amplification circuit 103 and an electrical signal to be supplied to the compensation converter 75 is amplified by the second amplification circuit 104, the two converters 20, 75 amplification factors of the drive currents, that is, electrical signals applied to the two converters, can be set correctly in accordance with, for example, a similarity ratio between the two converters 20, 75.

Figure 6:
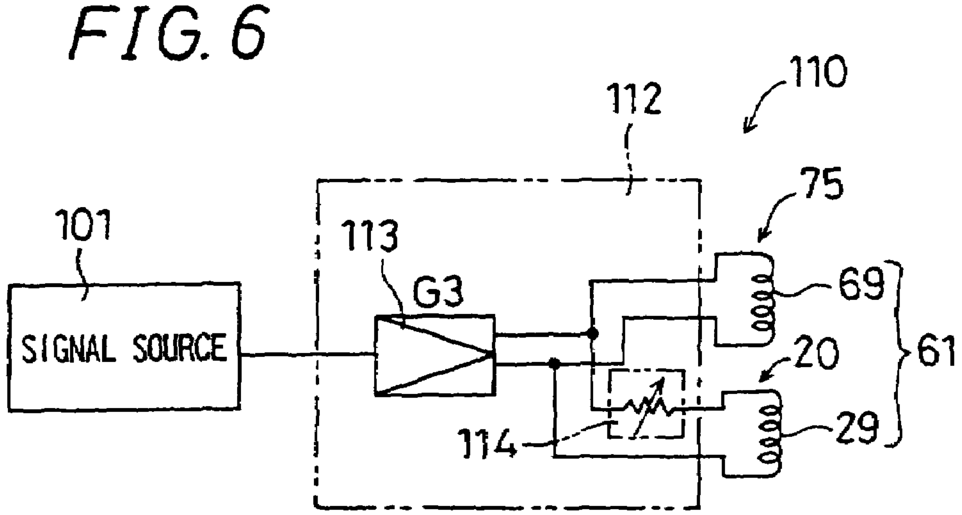
FIG. 6 is a block diagram showing, in a simplified manner, the electrical configuration of an acoustic signal output apparatus according to another embodiment of the invention.

FIG. 6 is a block diagram showing, in a simplified manner, the electrical configuration of an acoustic signal output apparatus 110 according to another embodiment of the invention. Components in FIG. 6 having the corresponding components in FIG. 5 are given the same reference symbols as the latter and will not be described below. The acoustic signal output apparatus 110 according to this embodiment is similar, in configuration, to the acoustic signal output apparatus 100 of FIG. 5. Attention should be paid to the facts that the acoustic signal output apparatus 110 is suitable for use with the speaker apparatus 61, and that a signal processing circuit 112 receives an output of the signal source 101, attenuates it, and supplies the main converter 20 and the compensation converter 75 with electrical signals having such phases that the voice coils 29 and 69 move in opposite directions.

The signal processing circuit 112 has an amplification circuit 113 and an attenuation circuit 114. The amplification circuit 113 amplifies a signal that is supplied to the main converter 20 and the compensation converter 75. The attenuation circuit 114 attenuates an output of the amplification circuit 113 and supplies an attenuated signal to the main converter 20. For example, the attenuation circuit 114 is a variable resistor circuit. The amplification factor of the amplification circuit 113 is set at a predetermined value G3. The attenuation factor of the attenuation circuit 114 is determined in accordance with the loads of mechanical vibration of the main converter 20 and the compensation converter 75. That is, the attenuation factor is so set that the vibration systems of the speaker unit 22 and the compensation unit 62 are given the same momentum.

An electrical signal from the signal source 101, corresponding to an acoustic signal to be outputted, is amplified at the amplification factor G3 by the amplification circuit 113. The amplified electrical signal is on one hand supplied to voice coil 69 of the compensation converter 75 as it is, and on the other hand attenuated by the attenuation circuit 114 and then supplied to voice coil 29 the main converter 20. The electrical signals supplied to the converters 20 and 75 have the same phase.

As described above, an output of the signal source 101 is amplified by the amplification circuit 113 of the signal processing circuit 112, and the amplified electrical signal is on one hand supplied to the voice coil 69 as it is and on the other hand attenuated by the attenuation circuit 114 and then supplied to the voice coil 29 (the electrical signals having the same phase are supplied to the voice coils 29 and 69). Further, an electrical signal to be supplied to the compensation converter 75 is amplified by the amplification circuit 113, and an electrical signal to be supplied to the main converter 20 is amplified by the amplification circuit 113 and then attenuated by the attenuation circuit 114. Therefore, the ratio between drive currents, that is, electrical signals applied to the converters 20 and 75, can be set correctly in accordance with a similarity ratio between the converters 20 and 75. In particular, Where a variable resistor circuit is used as the attenuation circuit 114, a drive current to be applied to the main converter 20 can be adjusted easily without deviating the phase.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A speaker apparatus comprising:

a speaker unit comprising:

a main converter, having a magnetic circuit, for converting an electrical signal into mechanical vibration;

a vibration plate for emitting sound waves to a front side of said main converter; and a frame fixed to said main converter, said frame vibratably supporting said vibration plate from a rear side of said vibration plate;

a compensation converter fixed to a rear side of said main converter, said compensation converter, having a different magnetic circuit from that of said main converter, for converting an electrical signal into mechanical vibration, and said compensation converter being smaller and lighter than said main converter; and a compensation mass body lighter than said vibration plate, said compensation mass body for serving as a load of mechanical vibration of said compensation converter.

* * * * *